United States Patent [19]

Sass et al.

[11] Patent Number: 5,418,878
[45] Date of Patent: May 23, 1995

[54] MULTI-MODE COMMUNICATIONS CABLE HAVING A COAXIAL CABLE WITH TWISTED ELECTRICAL CONDUCTORS AND OPTICAL FIBERS

[75] Inventors: Richard G. Sass, Portland; Richard A. Greulich, Lake Oswego, both of Oreg.; F. Paul Carlson, Fircrest, Wash.

[73] Assignee: Metropolitan Communication Authority, Inc., Tacoma, Wash.

[21] Appl. No.: 240,852

[22] Filed: May 9, 1994

[51] Int. Cl.⁶ .................. H01B 11/22; G02B 6/44
[52] U.S. Cl. .................. 385/101; 385/109
[58] Field of Search ............ 385/100, 101, 109

[56] References Cited

U.S. PATENT DOCUMENTS

| | | | |
|---|---|---|---|
| 4,097,119 | 6/1978 | Kumamaru et al. | 385/102 |
| 4,118,594 | 10/1978 | Arnaud | 385/104 |
| 4,156,104 | 5/1979 | Mondello | 174/70 R |
| 4,158,478 | 6/1979 | D'Auria et al. | 385/101 |
| 4,239,336 | 12/1980 | Parfree et al. | 385/101 |
| 4,371,234 | 2/1983 | Parfree et al. | 385/103 |
| 4,490,009 | 12/1984 | Nakai et al. | 385/101 |
| 4,552,989 | 11/1985 | Sass | 174/103 |
| 4,579,420 | 4/1986 | Winter et al. | 385/113 |
| 4,695,127 | 9/1987 | Ohlhaber et al. | 385/101 |
| 4,761,519 | 8/1988 | Olson et al. | 174/107 |
| 4,832,443 | 5/1989 | Cameron et al. | 385/101 |
| 4,856,867 | 8/1989 | Gaylin | 385/113 |
| 4,861,945 | 8/1989 | Buck et al. | 174/69 |
| 5,042,904 | 8/1991 | Story et al. | 385/105 |
| 5,237,635 | 8/1993 | Lai | 385/101 |
| 5,245,134 | 9/1993 | Vana, Jr. et al. | 174/117 F |

FOREIGN PATENT DOCUMENTS 1172272  11/1969  United Kingdom.
1592192  7/1981  United Kingdom.

OTHER PUBLICATIONS

Bystrzycki, Thomas A., "Gazing into the Broadband Crystal Ball," *Telephony*, Sep. 6, 1993.

*Primary Examiner*—Frank Gonzalez
*Attorney, Agent, or Firm*—Chernoff, Vilhauer, McClung & Stenzel

[57] ABSTRACT

A cable system having a coaxial cable and a plurality of twisted wire pairs and optical fibers has the capacity to carry a broad range of telephonic, video and demodulated data signal information in addition to optical signals. The cable is suitable for long distance telephonic, video and optical signals as well as transmitting signals directly into the home or office of an end user. In addition, the cable is suitable for use in local all-optical networks and for long distance and broad network all-optical cable systems of the future.

16 Claims, 4 Drawing Sheets

MULTI-MODE COMMUNICATIONS CABLE HAVING A COAXIAL CABLE WITH TWISTED ELECTRICAL CONDUCTORS AND OPTICAL FIBERS

BACKGROUND OF THE INVENTION

1. Field of the Invention

The present invention pertains to the transmission of data and communications over cables. More particularly, the present invention pertains to a cable for conducting data signals encoded as analog and digital electrical signals and digital optical signals.

2. Description of the Related Art

In general, the present invention pertains to the art of transmission of electrical and optical signals containing information. The most basic transmission device for transmitting electrical signals is a copper wire, but a single copper wire is subjected to many forms of interference and is therefore generally unsuitable for conducting many types of electrical information, particularly over long distances. One preferred method of reducing interference of electrical signals is the use of a twisted pair of wires which are quite effective in reducing magnetic pickup because the signals induced in successive twists cancel each other. Another cable that is effective in conducting electrical information and which is configured to reduce electrical interference is a coaxial cable. Clad, monomode glass fibers are effective in transmitting optical signal information.

Kao, U.K. Patent No. 1,172,272 discloses a composite coaxial transmission line having an optical fiber core and coaxially arranged metal conductors. Kao discloses that the coaxial metal conductors can be used to transmit electrical power to drive repeaters or other equipment associated with the optical signals. The use of coaxial metal conductors for transmitting power to repeaters was useful before the advent of erbium doped fibers that act as photonic amplifiers when excited by lasers. Because of photonic amplifiers, it is no longer necessary for fiber optic cables to transmit electrical power for their repeaters. It is now possible to construct all-optical networks that require no electronic amplification or switching.

Other previous systems also employ composite cables having optical fibers and coaxial conductors. Winter, et al., U.S. Pat. No. 4,579,420 discloses a cable having coaxially arranged electrical conductors wherein the innermost conductor is hollow and has optical fibers running therethrough. Kumamaru, et al., U.S. Pat. No. 4,097,119, discloses a cable containing both electrical conductors and optical fibers, and reinforced for improved strength in tension and bending. Arnaud, U.S. Pat. No. 4,118,594, discloses a cable system having a coaxial cable primarily for long distance telecommunications and optical fibers for possible future requirements as the telecommunications field seeks to use higher frequency analog and digital signals.

The previous composite systems disclosed cannot meet all present and future demands for transmission of electrical and optical signal information in a single, versatile cable usable over a prolonged service period transcending major technological changes. For example, with respect to present demands, although coaxial conductors are usable in the long distance electrical conduction of telephonic signals, local signals require the use of multiple twisted pairs of wires to accommodate multiple family units and different phone numbers. With respect to future demands, previous composite cable systems provide only a single electrical conductor circuit, limiting the use of the cable systems to a single mode of electrical transmission and foreclosing future multimode electrical transmission possibilities for communications and/or power supply purposes, requiring costly replacement of such cable systems when such future possibilities become realities.

SUMMARY OF THE INVENTION

The present invention overcomes the deficiencies noted in the prior art. In a preferred embodiment of the present invention, there is provided a composite cable having a coaxial conductor, at least one twisted wire pair and at least one optical fiber. Preferably, a plurality of twisted pairs and optical fibers are provided, all arranged circumferentially about the exterior of the coaxial cable for optimum space utilization, economy of manufacture, and cable flexibility. Thus, the present invention provides a universal cable that can be used, now and in the future, anywhere between any signal source and any end user, whether it be a residential home or office. The coaxial conductor may be used presently for conducting long distance telephonic signal information or, alternatively, CATV signals. The plurality of twisted pairs may be used presently for telephonic signals or modulated data signals. The optical fibers may be used presently for conducting long distance digital signals as well as for use in local area all-optical networks that are currently in use. In addition, as the technology develops, the optical fibers may be used for conducting digital telephonic or video signals directly to the end user, while the coaxial and twisted pair conductors can be connected to other multimode uses such as backup DC power and new developments with no need to replace the cable.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
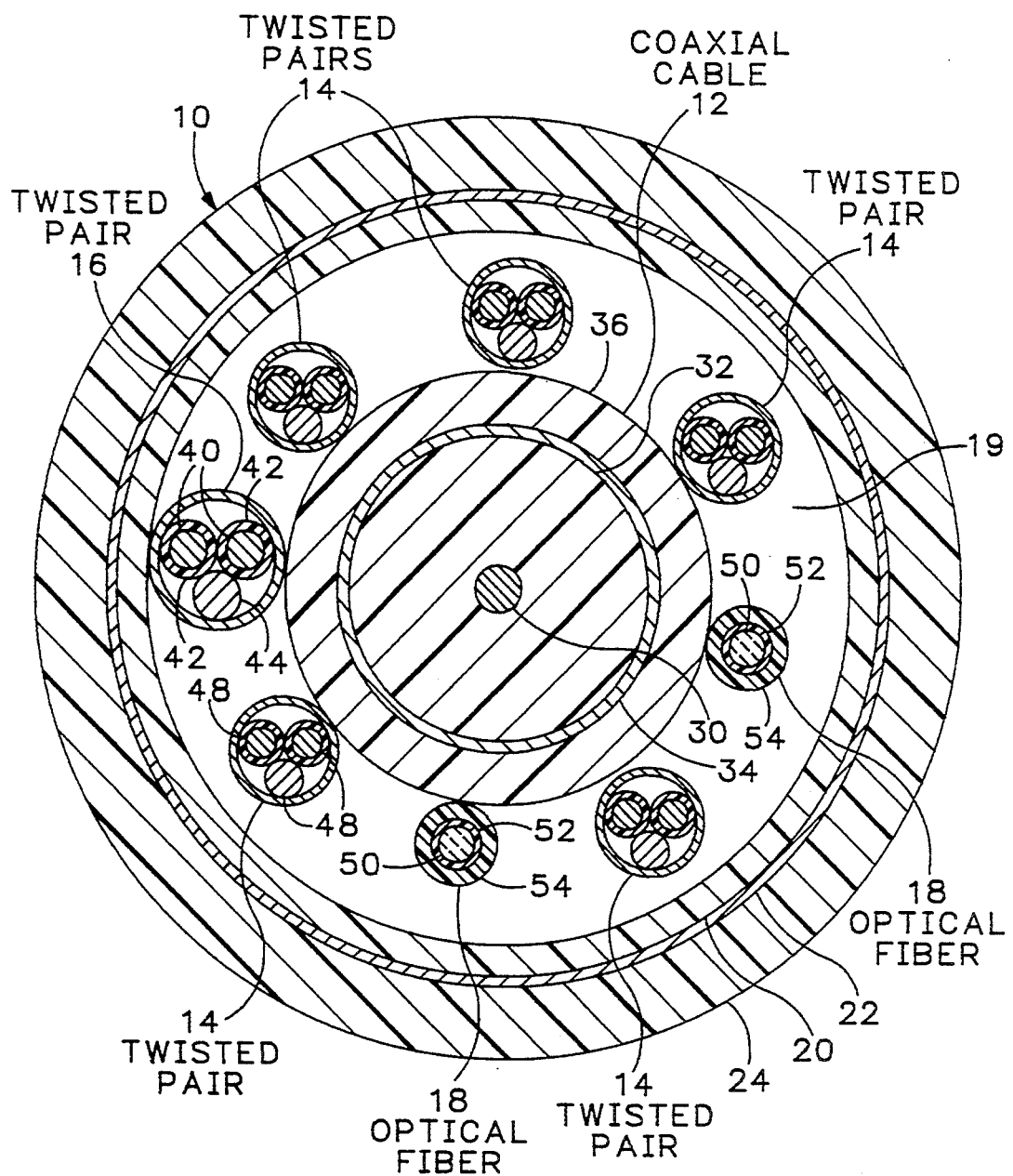
FIG. 1 is a cross-sectional view of a preferred embodiment of a cable of the present invention.
Figure 2:
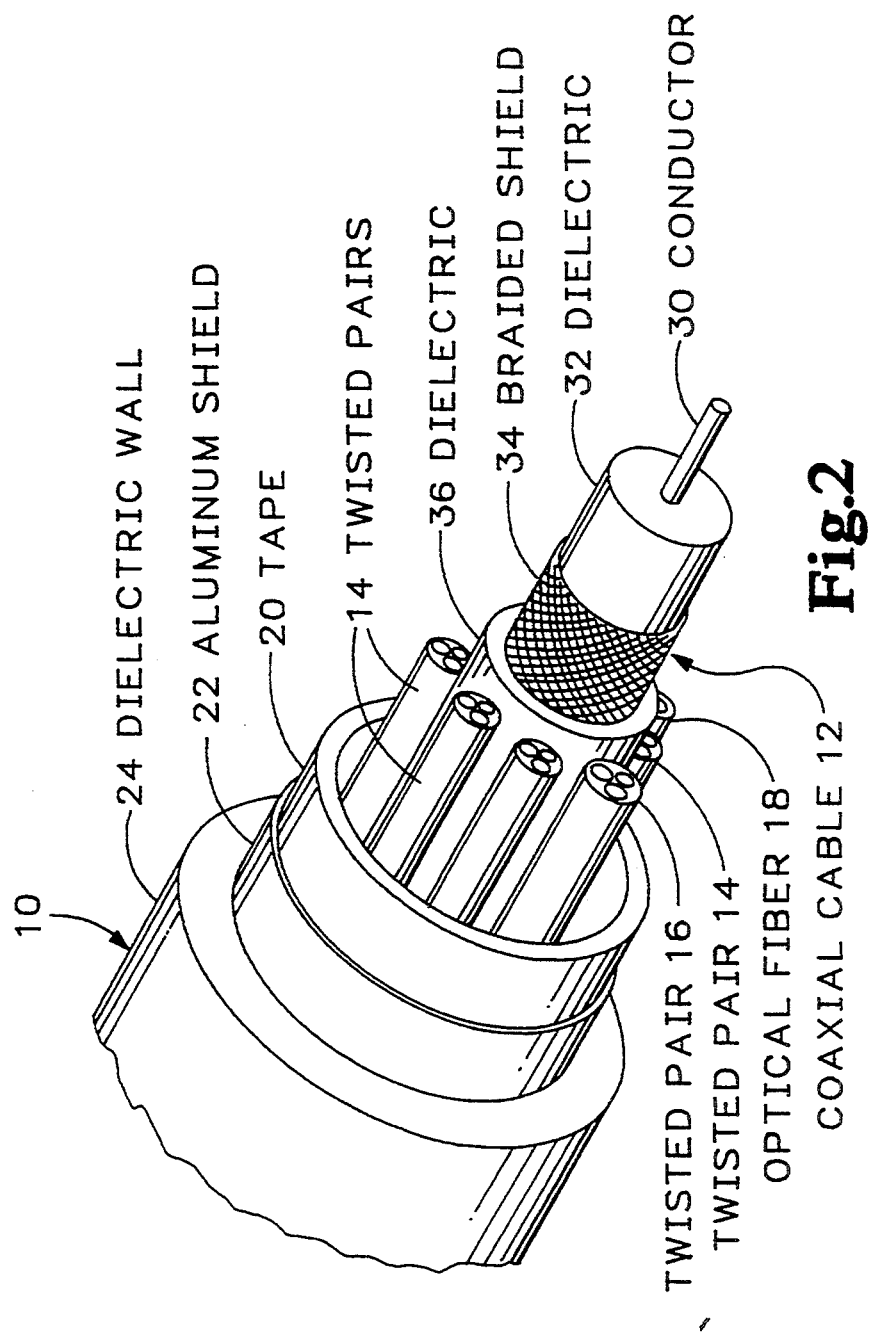
FIG. 2 is a cut away perspective view of the cable of FIG. 1.

In FIGS. 1 and 2 there is shown a preferred embodiment of a cable 10 of the present invention. The cable 10 has a centrally located coaxial cable 12. Located about the periphery of the coaxial cable 12 are a plurality of twisted wire pairs 14 which may include a similarly configured twisted wire pair 16 of a larger size having larger gauge wire conductors. Also located about the periphery of the coaxial cable 12 are a plurality of optical fibers 18. The combination of the coaxial cable 12, the twisted pairs 14 and 16, and the optical fibers 18 are enclosed in a water blocking tape 20, a corrugated aluminum sheath 22 and a polyethylene wall 24. Preferably, the twisted wire pairs and optical fibers 18 occupy the same circumferential, tubular region 19 coaxially interposed between the exterior of the coaxial cable 12 and interior of the water blocking tape 20.

The coaxial cable 12 of this preferred embodiment comprises a 22 AWG copper clad steel wire conductor 30 in a polyethylene dielectric 32, a 38 AWG tinned copper braided shield 34, and a polyethylene outer wall 36. The inner polyethylene dielectric 32 has a nominal diameter of 0.072 inches. The polyethylene outer wall 36 has a nominal wall thickness of 0.025 inches. It is to be understood that although the preferred embodiment describes the gauge thickness of the wires and the nominal wall thicknesses of the dielectrics, other gauge wires and other dielectrics having different nominal wall thicknesses would also be suitable and could be substituted for the gauges and nominal dimensions given.

In the preferred embodiment of FIGS. 1 and 2, five 26 AWG copper wire twisted pairs 14 are located about the periphery of the coaxial cable 12. There is also a single 22 AWG copper wire twisted pair 16 similarly located about the periphery of the coaxial cable 12. Except for the gauge of the wires used in the respective twisted pairs, the makeup of twisted pairs 14 and twisted pairs 16 is substantially identical. With respect to twisted pairs 16, as exemplary of the twisted pair construction, there are two 22 AWG solid copper wires 40 each having a polyvinyl chloride (PVC) wall 42. The two 22 AWG wires 40 are intertwined in a standard twisted pair configuration. The twisted wire pair 16 also includes a 24 AWG solid copper wire drain 44. Enclosing the drain 44 and wires 40 is an aluminized polyester tape 46. In the preferred embodiment, the aluminized polyester tape 46 has a nominal wall thickness of 0.001 inches and is wrapped about the wires 40 and 44 so as to provide a nominal 45% overlap. As mentioned, the composition of the twisted pairs 14 is substantially identical with that of the twisted pair 16; the exception being that the twisted pair 14 uses wires that are 26 AWG. The plurality of small gauge twisted pairs 14 and a single large gauge twisted pair 16 provides the greatest flexibility without incurring undue expense. The twisted pairs 14 and 16 are suitable for telephonic and demodulated data signals compatible with current technology. However, it is envisioned that future technology may require application-specific demodulators or decoding circuits that would optimally be separately powered for reliability. The twisted pairs 14 and 16 may be configured to provide power for such circuits and the larger gauge twisted pair 16 would be capable of carrying greater power, thereby providing more options for capability with future technology.

The optical fibers 18 are also located about the periphery of the coaxial cable 12. Preferably, the optical fiber 18 is comprised of a 250 μM fiber 50. The fiber 50 is a single mode, tight-buffered glass fiber. A sheath 52 is located about the fiber 50 and a jacket 54 is located about the sheath. Exemplary, the sheath 52 may be comprised of a high molecular weight aramid fiber such as is sold under the trademark KEVLAR. The jacket 54 may be comprised of PVC or other material that is suitable for preventing damage to the glass fiber 50.

Figure 3:
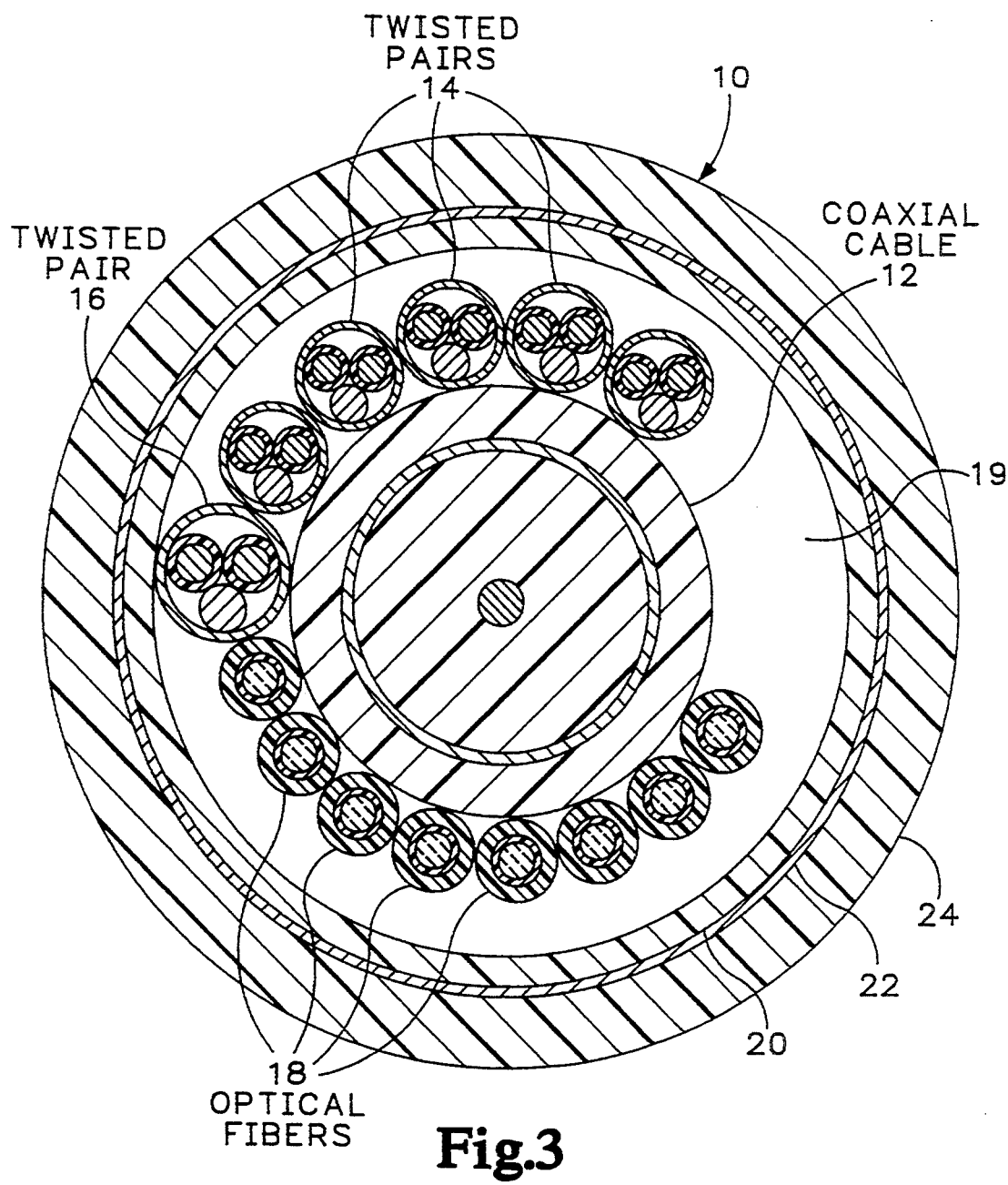
FIG. 3 is a cross-sectional view of an alternative embodiment of a cable of the present invention.

FIG. 3 shows another preferred embodiment of a cable 10' of the present invention. The cable 10' has the centrally located coaxial cable 12 and a plurality of twisted pairs comprising five 26 AWG twisted pairs 14 and a single 22 AWG twisted pair 16. The composition of the twisted pairs 14 and 16 is identical with that as described above with reference to the preferred embodiment shown in FIGS. 1 and 2. The present preferred embodiment includes eight optical fibers 18 which are also configured as described above with reference to the preferred embodiment shown in FIGS. 1 and 2. The cable 10' also includes the water blocking tape 20, the corrugated aluminum sheath 22 and the polyethylene wall 24.

Figure 4:
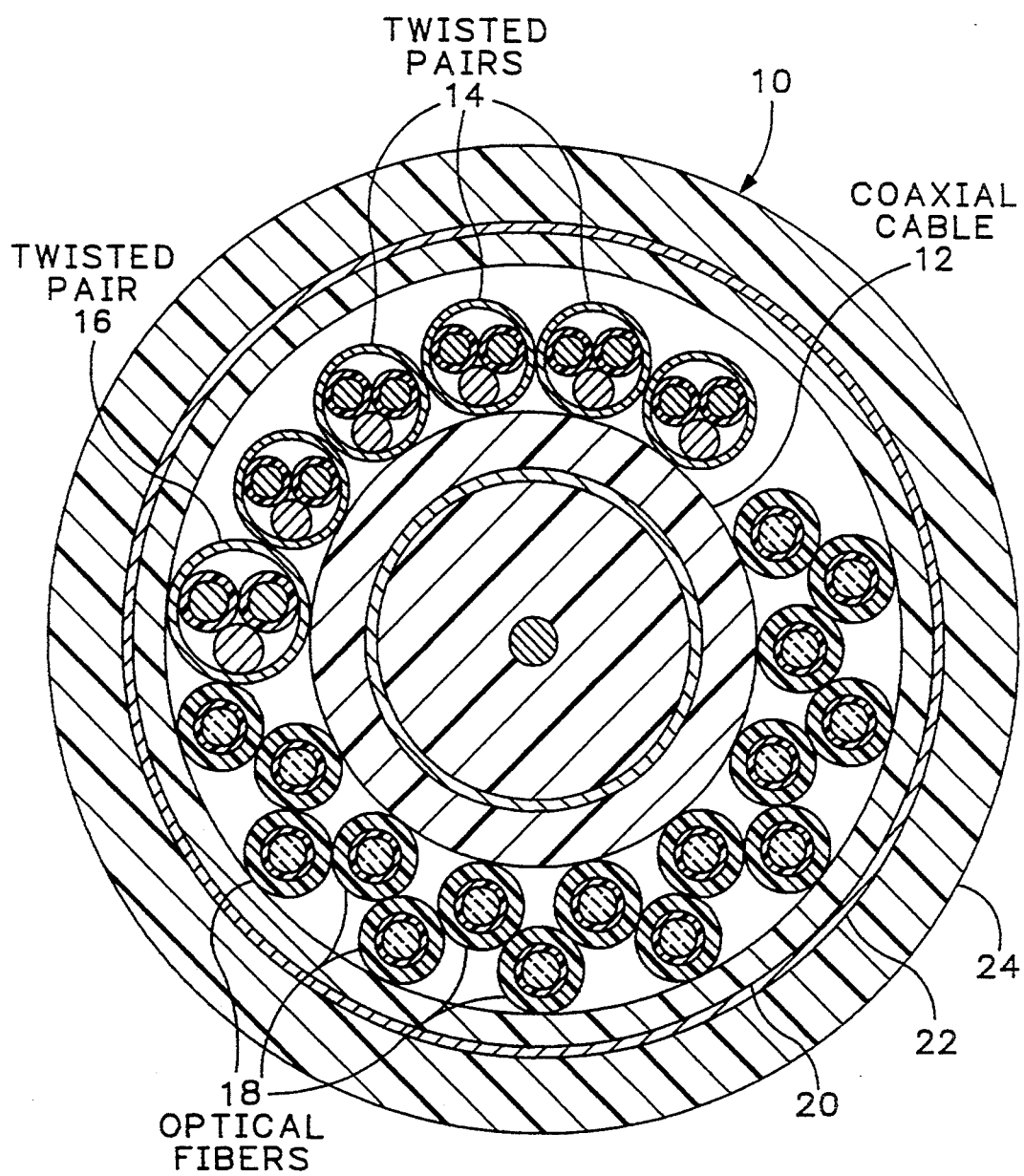
FIG. 4 is a cross-sectional view of another alternative embodiment of a cable of the present invention.

In FIG. 4 is shown another preferred embodiment of a cable 10" of the present invention. The cable 10" includes the coaxial cable 12, five 26 AWG twisted pairs 14 and the 22 AWG twisted pair 16. The cable 10" also includes a plurality of fibers arranged in an alternating pattern having one row located contiguous with the periphery of the coaxial cable 12 and a second row, interlaced between the first row, contiguous with the inner periphery of the water blocking tape 20. As shown in FIG. 4, there are 16 optical fibers 18. But it is to be understood that there could be a greater or fewer number of optical fibers 18 in the cable 10".

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A composite cable for conducting electrical signals associated with audio, video and data communications, and optical signals, said cable comprising the combination:
   (a) at least one coaxial cable having an electrical conductor, a coaxially arranged dielectric and a coaxially arranged tubular conductor;
   (b) at least one twisted pair of electrically conductive wires and at least one optical fiber, said at least one twisted pair and said at least one optical fiber being arranged coextensively with said coaxial cable; and
   (c) a tubular encasement arranged about said at least one coaxial cable, said at least one twisted pair, and said at least one optical fiber.

2. The cable of claim 1 wherein said at least one twisted pair and said at least one optical fiber are located exterior of said coaxial cable.

3. The cable of claim 1 wherein said at least one twisted pair comprises a plurality of twisted pairs arranged circumferentially about the exterior of said coaxial cable.

4. The cable of claim 1 wherein said at least one optical fiber comprises a plurality of optical fibers arranged circumferentially about the exterior of said coaxial cable.

5. The cable of claim 1 wherein said coaxial cable and said tubular encasement define a tubular region that is substantially coaxial with and exterior of said coaxial cable and all said at least one twisted pair and said at least one optical fiber are located within said region.

6. A composite cable for conducting electrical signals associated with audio, video and data communications, and optical signals, said cable comprising the combination:
   (a) at least one coaxial cable having an electrical conductor, a coaxially arranged dielectric and a coaxially arranged tubular conductor;
   (b) at least one twisted pair of electrically conductive wires and at least one optical fiber, said at least one twisted pair and said at least one optical fiber being arranged circumferentially about the exterior of said coaxial cable; and (c) a tubular encasement arranged about said at least one coaxial cable, said at least one twisted pair, and said at least one optical fiber.

7. The cable of claim 6 wherein said coaxial cable and said tubular encasement define a tubular region that is substantially coaxial with and exterior of said coaxial cable and all said at least one twisted pair and said at least one optical fiber are located within said region.

8. The cable of claim 7 wherein a plurality of twisted pairs and a plurality of optical fibers are located within said region.

9. A composite cable for conducting electrical signals associated with audio, video and data communications, and optical signals, said cable comprising the combination:

(a) at least one coaxial cable having an electrical conductor, a coaxially arranged dielectric and a coaxially arranged tubular conductor;

(b) at least one twisted pair of electrically conductive wires and at least one optical fiber, said at least one twisted pair and said at least one optical fiber being arranged coextensively with said coaxial cable; and (c) a tubular encasement, comprising an electrically conductive sheath and a dielectric wall, arranged about said at least one coaxial cable, said at least one twisted pair, and said at least one optical fiber.

10. A composite cable for conducting electrical signals associated with audio, video and data communications, and optical signals, said cable comprising the combination:

(a) at least one coaxial cable having an electrical conductor, a coaxially arranged dielectric and a coaxially arranged tubular conductor;

(b) a plurality of twisted pairs of electrically conductive wires of a first size, and a twisted pair of electrically conductive wires of a second size larger than said first size, and at least one optical fiber, said twisted pairs and said at least one optical fiber being arranged coextensively with said coaxial cable; and (c) a tubular encasement arranged about said at least one coaxial cable, said twisted pairs, and said at least one optical fiber.

11. A composite cable for conducting electrical signals associated with audio, video and data communications, and optical signals, said cable comprising the combination:

(a) at least one coaxial cable having an electrical conductor, a coaxially arranged dielectric and a coaxially arranged tubular conductor;

(b) at least one twisted pair of electrically conductive wires and at least one optical fiber, said at least one twisted pair and said at least one optical fiber being arranged circumferentially about the exterior of said coaxial cable; and (c) a tubular encasement, comprising an electrically conductive sheath and a dielectric wall, arranged about said at least one coaxial cable, said at least one twisted pair, and said at least one optical fiber.

12. A composite cable for conducting electrical signals associated with audio, video and data communications, and optical signals, said cable comprising the combination:

(a) at least one coaxial cable having an electrical conductor, a coaxially arranged dielectric and a coaxially arranged tubular conductor;

(b) a plurality of twisted pairs of electrically conductive wires of a first size, and a twisted pair of electrically conductive wires of a second size larger than said first size, and at least one optical fiber, said twisted pairs and said at least one optical fiber being arranged circumferentially about the exterior of said coaxial cable; and (c) a tubular encasement arranged about said at least one coaxial cable, said twisted pairs, and said at least one optical fiber.

13. A composite cable for conducting electrical signals associated with audio, video and data communications, and optical signals, said cable comprising the combination:

(a) at least one coaxial cable having an electrical conductor, a coaxially arranged dielectric and a coaxially arranged tubular conductor;

(b) a plurality of twisted pairs of electrically conductive wires, and a plurality of optical fibers, said plurality of twisted pairs and said plurality of optical fibers being arranged coextensively with said coaxial cable; and (c) a tubular encasement arranged about said at least one coaxial cable, said plurality of twisted pairs and said plurality of optical fibers.

14. The cable of claim 13 wherein said tubular encasement comprises an electrically conductive sheath and a dielectric wall.

15. The cable of claim 13 wherein said plurality of twisted pairs and said plurality of optical fibers are arranged circumferentially about the exterior of said coaxial cable.

16. The cable of claim 13 wherein said coaxial cable and said tubular encasement define a tubular region that is substantially coaxial with and exterior of said coaxial cable and all of said plurality of twisted pairs and said plurality of optical fibers are located within said tubular region.

* * * * *